United States Patent
Owen et al.

(10) Patent No.: US 6,715,883 B2
(45) Date of Patent: Apr. 6, 2004

(54) SPATIAL COLOR DITHERING USING AN ACTIVE COLOR FILTER AND LENTICULAR ARRAY TO SUPPRESS COLOR BREAKUP IN DISPLAYS

(75) Inventors: Geraint Owen, Palo Alto, CA (US); Laurence Hubby, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 119 days.

(21) Appl. No.: 10/264,849

(22) Filed: Oct. 4, 2002

(65) Prior Publication Data

US 2003/0058412 A1 Mar. 27, 2003

Related U.S. Application Data

(62) Division of application No. 09/724,722, filed on Nov. 28, 2000, now Pat. No. 6,464,359.

(51) Int. Cl.[7] .............................................. G03B 21/14
(52) U.S. Cl. ............................................ 353/31; 353/84
(58) Field of Search .............................. 353/30–34, 84; 348/742, 760, 761; 349/5, 8–10

(56) References Cited

U.S. PATENT DOCUMENTS

| | | | | |
|---|---|---|---|---|
| 4,294,524 A | * | 10/1981 | Stolov | 353/84 |
| 4,368,963 A | * | 1/1983 | Stolov | 353/31 |
| 5,829,856 A | * | 11/1998 | Nakamura et al. | 353/84 |
| 6,050,689 A | * | 4/2000 | Nakamura et al. | 353/31 |
| 6,467,909 B2 | * | 10/2002 | Inoue et al. | 353/30 |
| 6,535,256 B1 | * | 3/2003 | Ishihara et al. | 353/31 X |
| 6,540,361 B1 | * | 4/2003 | Hayashi | 353/31 |

* cited by examiner

Primary Examiner—W. B. Perkey (57) ABSTRACT

An optical projection system that combines a lenslet array and lightvalve with an active color filter. The active color filter may be placed at either the illuminating aperture plane or at any position conjugate or incident to the output plane of the projection lens of the system.

17 Claims, 7 Drawing Sheets

|   | A | B | C |
|---|---|---|---|
| 1 | Black<br>Phase 1: 0<br>Phase 2: 0<br>Phase 3: 0 | Red<br>Phase 1: 0<br>Phase 2: 1<br>Phase 3: 0 | Green<br>Phase 1: 1<br>Phase 2: 0<br>Phase 3: 0 |
| 2 | Blue<br>Phase 1: 0<br>Phase 2: 1<br>Phase 3: 0 | Yellow<br>Phase 1: 1<br>Phase 2: 1<br>Phase 3: 0 | Cyan<br>Phase 1: 1<br>Phase 2: 0<br>Phase 3: 1 |
| 3 | Magenta<br>Phase 1: 1<br>Phase 2: 1<br>Phase 3: 0 | White<br>Phase 1: 1<br>Phase 2: 1<br>Phase 3: 1 | 50% Gray<br>Phase 1: 1/2<br>Phase 2: 1/2<br>Phase 3: 1/2 |

SPATIAL COLOR DITHERING USING AN ACTIVE COLOR FILTER AND LENTICULAR ARRAY TO SUPPRESS COLOR BREAKUP IN DISPLAYS

This is a divisional of copending application No. 09/724,722 filed on Nov. 28, 2000 now U.S. Pat. No. 6,464,359, which is hereby incorporated by reference herein.

FIELD OF THE INVENTION

The present invention is directed towards spatial dithering for optical projection displays.

BACKGROUND OF THE INVENTION

Optical projection systems in which the image is generated by light modulated by one or more "lightvalves" are becoming increasingly common. Devices such as televisions, presentation projectors and computer monitors have utilized such lightvalve based projection systems. Typically, in a single lightvalve system, a color image is produced by projecting red (R), green (G) and blue (B) (collectively referred to as "primary" hereinafter) image fields in a time sequential manner with sufficient rapidity that flicker is not apparent. The overall frame rate desired for color images is typically 60 Hertz or greater. Thus, the corresponding interval between each color image field is $\frac{1}{180}$th of a second or less.

Single lightvalve systems are relatively inexpensive and the resulting performance is satisfactory. However, an inherent drawback of time sequential lightvalve and other systems is an effect known as 'color breakup artifact' or 'field sequential color artifact'. Color breakup artifact manifests itself to a viewer as a transient rainbow-like fringing effect when rapid eye movements of several degrees are made. The effect is an inherent property of the human visual system but sensitivity to the effect varies greatly from person to person. Moreover, the seriousness of the effect depends strongly on the nature of the image being viewed.

One theory is that increasing the frame rate from 60 Hertz to several hundreds or thousands of Hertz would eliminate color breakup artifact. However, since driving displays at such high frequencies presents complicated and expensive engineering problems, experimental evidence for the increased frame rate theory is difficult to obtain.

An alternative approach is to abandon time sequential imaging while still using only one lightvalve by presenting the primary colors to the viewer in the space domain, rather than in the time domain. One way of constructing such a space sequential system would be to arrange the R, G and B pixels in a mosaic pattern, like the arrangement of phosphor spots in a Cathode Ray Tube device. The lightvalve would be illuminated using white light, and each R pixel would be covered with a red filter, each G pixel with a green filter and each B pixel with a blue filter. The requisite filter array would contain about $10^6$ or more filters. Furthermore, in the case of a micro-display lightvalve array, each filter would measure only 10×10 $\mu m^2$. Though conceptually easy, implementing such large filter arrays and such small individual filters could be prohibitively expensive. Disadvantageously, compared to field sequential imaging, mosaic filter arrays need about three times as many pixels.

An approach which does not suffer from the disadvantage of an increased pixel count has also been proposed. Though using a mosaic filter, the filter is 'spatially dithered' over the lightvalve by approximately plus or minus one pixel horizontally and vertically. For a 60 Hertz frame rate, the 'dither rate' would be about 180 Hertz. A conventional way to achieve dithering is in the use of a spatial multiplexer. A possible disadvantage of the spatial multiplexer is the cost of the device itself. Another is its thickness of 3 to 5 millimeters, which would increase the back focal length required of the projection lens, thereby increasing the cost of the projection optics. A third is that it entails the use of a mosaic filter.

Thus there is a need to implement spatial dithering with a lower cost and complexity.

SUMMARY

The invention in one or more embodiments consists of a lenslet array placed immediately in front of a lightvalve, and a segmented active color filter placed at the projection lens' aperture stop or at any position optically conjugate thereto. Using a segmented color filter that is 'active' (in the sense that the colors of the filter segments are sequenced), the spatial dithering process can be placed under electronic control. In various embodiments, the active color filter can produce any pattern and configuration of colors, which are then repeated throughout the lightvalve. Further, in some embodiments, the lenslet array and lightvalve may be separated from one another.

DETAILED DESCRIPTION OF THE INVENTION

The invention is directed toward implementing spatial dithering in a novel manner. One or more embodiments described herein places a lenticular array just in front of the lightvalve, and a segmented active color filter at a position incident to or optically conjugate to the projection lens' aperture stop. Using a segmented color filter that is 'active' (in the sense that the colors of the filter segments are sequenced), the spatial dithering process can be placed under electronic control. Color sequencer devices, which are readily available, may be used to sequence or change the colors of the filter.

Figure 1:
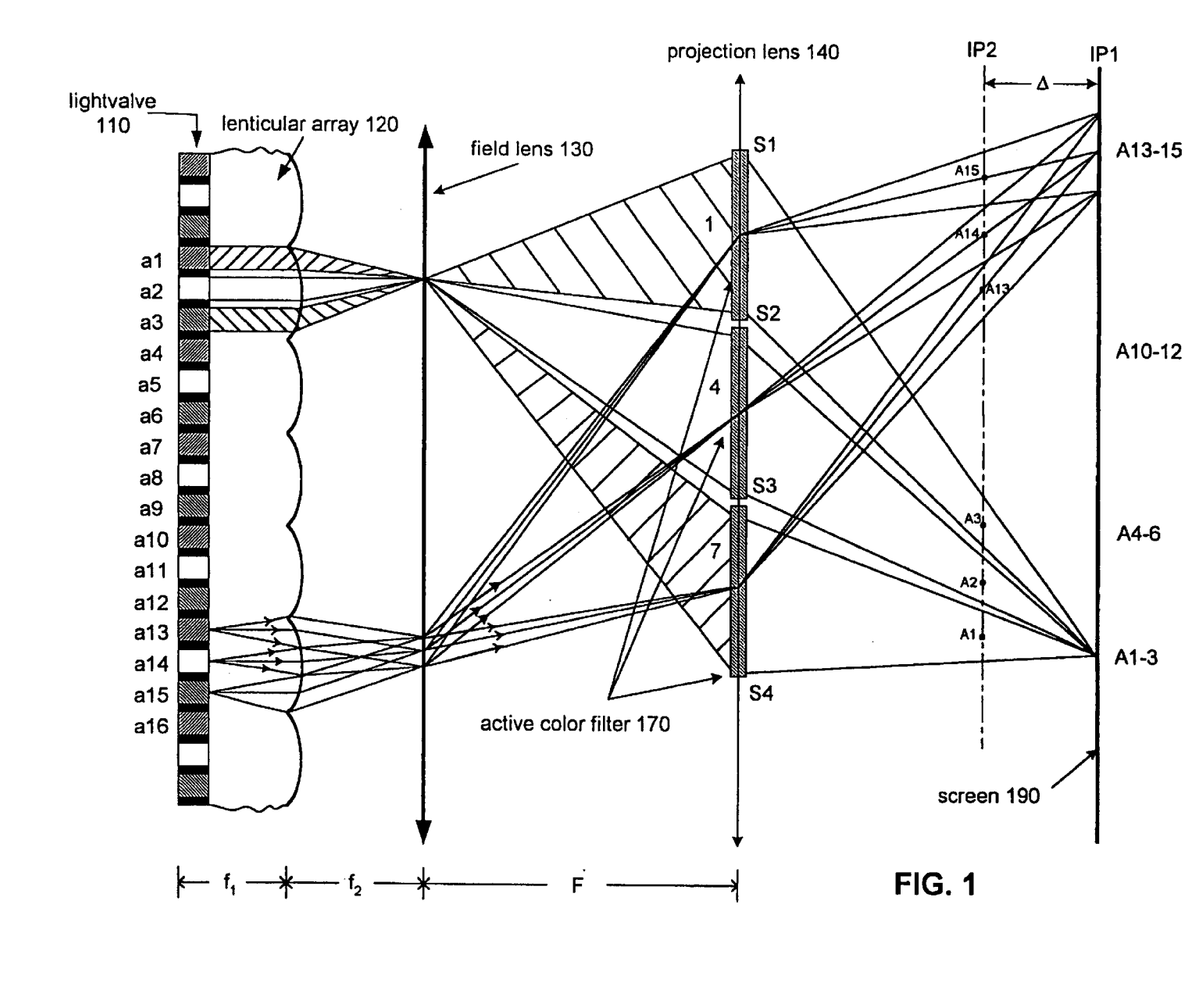
FIG. 1 illustrates a schematic of an exemplary optical system employing one or more embodiments of the invention involving spatial dithering via a lenticular array.

FIG. 1 illustrates a schematic of an exemplary optical system employing one or more embodiments of the invention. The optical system consists of a lightvalve 110 built upon a lenticular array 120 as well as a filter 170. Filter 170 is shown sectioned in three and is an active or electronically controlled filter which can sequence colors. The optical system illustrated in FIG. 1 is configured to provide spatial dithering via a lenticular array 120 and performs two vital functions:

1) The system maps each pixel of a lightvalve 110 into a corresponding location of a virtual image plane IP2; and
2) The system maps a given number of k sections of the active color filter 170 onto each group of k pixels of the image onto screen 190.

For the purposes of illustration, the field lens 130 and projection lens 140 are assumed to be thin and ideal. A portion of the lightvalve 110 shown in FIG. 1 is a vertical section through the 'a' column of the array. The optical system of FIG. 1 is assumed to have the filter 170 operating in one of its phases (sequence and arrangement of colors). The optical system of FIG. 1 has the following characteristics and parameters:

The focal length of the lenticules (of any section of the lenticular array 120) into glass is $f_1$;
The focal length of the lenticules (of any section of the lenticular array 120) into air is $f_2$.
Thus, if the glass has a refractive index of N, and the radius of curvature of each lenticule is R, then:

$$\frac{N}{f_1} = \frac{1}{f_2} = \frac{N-1}{R}$$

The active color filter 170 is placed at the plane of the projection lens 140. (In the case of a thick projection lens, it would be placed approximately at its principal plane.)
The focal length of the field lens 130 is F, and the separation between the field lens 130 and projection lens 140 is equal to F
The plane IP1 (coincident with the plane of screen 190 upon which the image is displayed) is conjugate to the plane of the field lens 130.

The rays emanating from pixels a1, a2 and a3 are assumed to be parallel to the optic axis. The rays emanating from a1, a2 and a3 are brought to a common image point A1–3 in image plane IP1 (screen 190). In the section shown, all the rays from a3 pass through the region between S1 to S2 in the plane of the projection lens 140. This corresponds to a first section (labeled section 1) of the active color filter 170. Similarly, the rays emanating from a2 pass through the region between S2 and S3 in the plane of the projection lens 140 corresponding to a second section (labeled section 4) of the active color filter 170. The rays emanating from a3 pass through the region between S3 and S4 in the plane of the projection lens 140, corresponding to the third section (labeled section 7) of the active color filter 170.

Similar rays (i.e. rays parallel to the optic axis) emanating from pixels a4, a5 and a6 are not depicted in FIG. 1, but given the optical characteristics of the system, these rays are brought to a common image point at A4–6 in plane IP1 (screen 190). All the rays emanating from a4 pass through section 7 of the active color filter 170, those from a5 pass through Section 4 and those from a6 pass through section 1.
By Induction, in General All rays emanating parallel to the optic axis from any group of three pixels served by the same lenticule are brought to a common image point at the plane IP1 (screen 190).
All the rays emanating parallel to the optic axis from pixels such as a1, a4, a7, ... a(1+3 n), where n is an integer, pass through Section 7 of the active color filter 170.

All the rays emanating parallel to the optic axis from pixels such as a2, a5, a8, ... a(2+3 n), where n is an integer, pass through Section 4 of the active color filter 170.
All the rays emanating parallel to the optic axis from pixels such as a3, a6, a9, ... a(3+3 n), where n is an integer, pass through Section 1 of the active color filter 170.

While FIG. 1 has been drawn as an approximation and is not to scale, the optical elements therein behave with the following properties:

1) The distance (D1) between the image point in plane IP1 (screen 190) and the optic axis is proportional to the distance (D2) between the central pixel in the group of three and the optic axis in the plane of the lightvalve 110; and
2) The constant of proportionality between distances D1 and D2 is equal to the magnification of the projection lens 140.

The rays emanating from a13 to a15 are shown as emitted into a cone from the center of each pixel. These rays will from a superimposed patch at A13–15 in image plane IP1. The plane of the active color filter 170 is conjugate with the plane of the lightvalve 110. As a result, all the rays from pixel a15 are imaged at the center of section 1 of the active color filter 170. All the rays from a14 are imaged at the center of section 4 of the active color filter 170 and all the rays from a13 are imaged at the center of section 7 of the active color filter 170.

Given the above optical constraints, similar rays (i.e. rays from the center of each pixel) emanating from pixels a10, a11 and a12 (not depicted in FIG. 1), are brought to a common superimposed patch at A10–12 in plane IP1 (screen 190). Likewise, all the rays from a12 pass through section 1 of the active color filter 170, those from all pass through section 4 of the active color filter 170 and those from a10 pass through section 7 of the active color filter 170.
In General:

All rays emanating from the center of each pixel in a group of three pixels served by the same lenticule are brought to a common superimposed patch at the plane IP1 (screen 190).
All the rays emitted from the centers of pixels a1, a4, a7, ... a(1+3 n), where n is an integer, pass through the center of section 7 of the active color filter 170.
All the rays emitted from the centers of pixels a2, a5, a8, ... a(2+3 n) pass through the center of section 4 of the active color filter 170.
All the rays emitted from the centers of pixels a2, a5, a8, ... a(2+3 n) pass through the center of section 1 of the active color filter 170.

Furthermore, the following properties apply to the optics depicted in FIG. 1:

1) The distance (D3) between the center of the patch in image plane IP1 (screen 190) and the optic axis is proportional to the distance (D4) between the central pixel in the group of three and the optic axis in the plane of the lightvalve 110; and
2) The constant of proportionality between distances D3 and D4 is equal to the magnification of the projection lens 140.

For illustration, assume that a white area is being imaged. Then regions such as A13–15, A10–12, A7–9, A4–6, and A1–3 will be colored white, and the regions between them will (to first order) not be illuminated. Since patch A13–15 represents a combination of pixels a13, a14 and a15, and so on, this means that each group of 3 pixels (not the individual pixels themselves) of the lightvalve 110 is represented at the screen 190.

In one embodiment of the invention, the projected image may be viewed at an image plane such as IP1 (screen 190). Image plane IP1 is offset from image plane IP2, and is chosen such that the patches A15, A14 and A13 and A3, A2 and A1 are individually resolved on the screen 190. Since patch A14 corresponds to pixel a14, and so on, this means that the individual pixels of the lightvalve 110 are mapped on to the plane IP2. Furthermore, the optical system has the desired effect of mapping the active color filter 170 'in parallel' onto each group of pixels served by a given lenticule.

The image plane IP2 represents a plane at which there is no gap or overlap between the projected image pixels. Assume that L is the image distance of the projection lens 140 (i.e. the distance between the image plane IP2 and the projection lens 140). Assume also that P represents the dimension of a pixel at the screen 190 (e.g. the distance between pixels such as A1 and A2) and that S is the linear dimension of each section of the active color filter 170. It can be shown by geometric proof that the offset distance, Δ, between image planes IP1 and IP2 is given by:

$$\Delta = \frac{P * L}{S}$$

Figure 2:
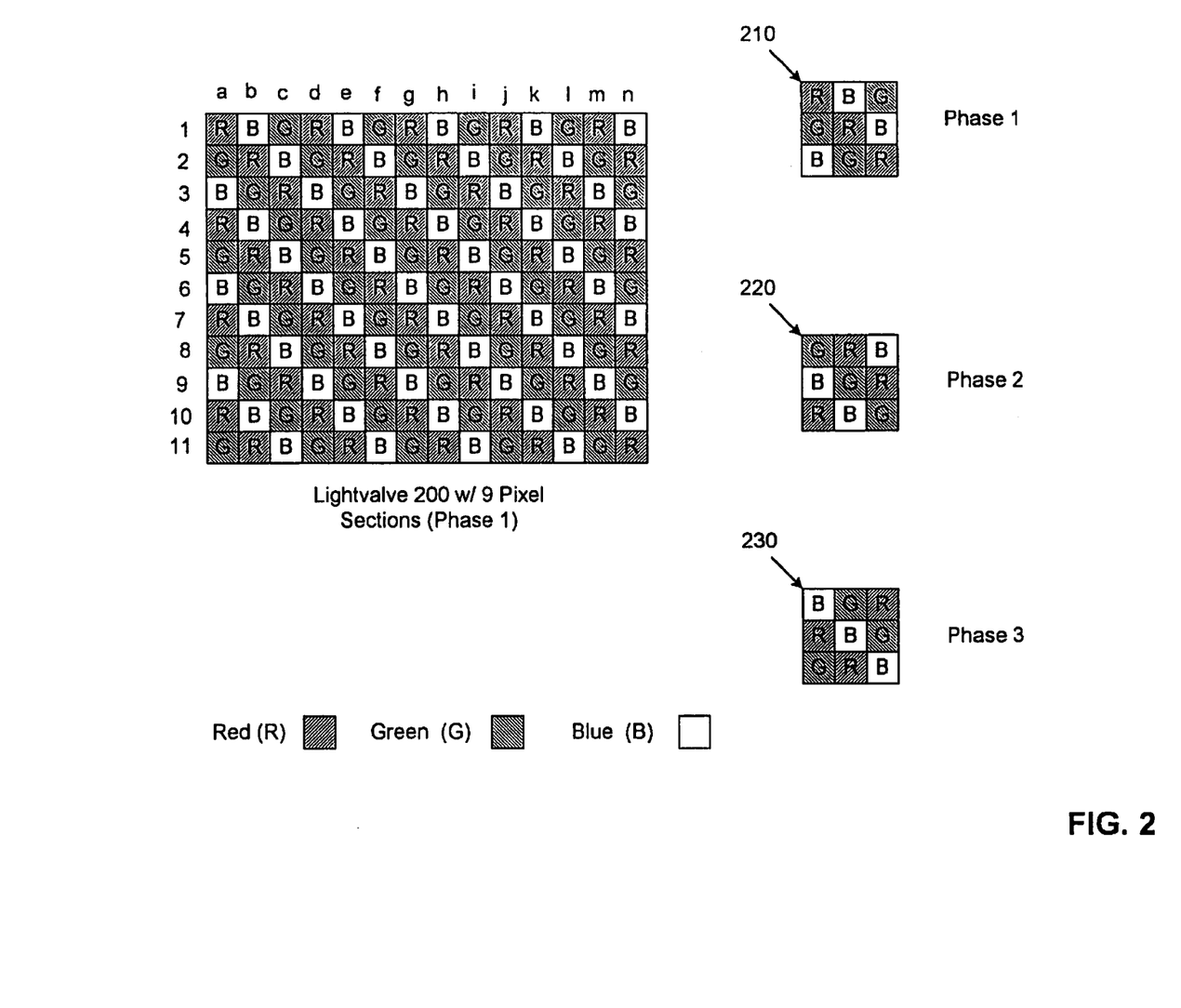
FIG. 2 illustrates a portion of the lightvalve of FIG. 1 and depicts the three phases of the active color filter.

FIG. 2 illustrates a portion of the lightvalve 110 of FIG. 1 and depicts the three phases of the active color filter. The lightvalve 110 used in the optics system of FIG. 1 shows only the 'a' column of the lightvalve 200 depicted in FIG. 2. Looking into the plane of FIG. 1, the lightvalve therein would have at least as many columns such as 'a' through 'n' depicted in FIG. 2. The lightvalve is modulated by an active color filter which operates in three phases. Each phase should last for $\frac{1}{180}$ second if the image frame rate is to be 60 Hertz.

The optical projection system in various embodiments of the invention maps the nine sections of the active color filter onto each group of nine pixels of the lightvalve 200 (or equivalently, of the image). As a result of the mapping, the following occurs:

1) The color of each pixel in the projected image is determined by a time sequential process. (A time interval of $\frac{1}{180}$ second is available for each of the primary colors at a 60 Hertz frame rate.)

2) At any given time, approximately ⅓ of the pixels in the projected image are red, ⅓ are green and ⅓ are blue when a white area is being displayed.

For instance, in a 60 Hertz desired frame rate, each section of the filter will exist in a R (Red) state for $\frac{1}{180}$ second, in the G (Green) state for $\frac{1}{180}$ second and in the B (Blue) state for $\frac{1}{180}$ of a second. This varying color projection suppresses the color breakup artifact effect in the image.

The nine-pixel block 210 is what the active color filter produces during phase 1 of its operation. The lightvalve 200 is shown in its state when the active color filter operates in phase 1 and thus repeats block 210 starting from pixel location a1. For instance, in row 1, pixel a1 shows a Red colored intensity, pixel b1 shows a Blue colored intensity and pixel c1 shows a Green intensity. Pixels a2, b2 and c2 of row 2 show Green, Red and Blue, respectively, and pixels a3, b3 and c3 of row 3 show Blue, Green and Red, respectively. Though not shown on lightvalve 200, the nine-pixel block 220, which is produced by the active color filter operating in phase 2, would be repeated throughout lightvalve 200 starting at pixel location a1. Likewise, the nine-pixel block 230, which is produced by the active color filter operating in phase 3, would be repeated throughout lightvalve 200 starting at pixel location a1.

The overall effect of sequencing the filter through these phases is a combination of Red, Green and Blue intensities for each pixel location in the lightvalve 200. Thus, all the pixel locations a1, a2, a3, . . . , a11, b1, b2, b3, . . . , b11 . . . n1, n2, n3, . . . n11 will show a combination of Red, Green and Blue within $\frac{1}{60}$th of a second, giving a frame rate of 60 Hertz. Red, Green and Blue are evenly represented in each of the three filter phases which may reduce flickering.

Figure 3:
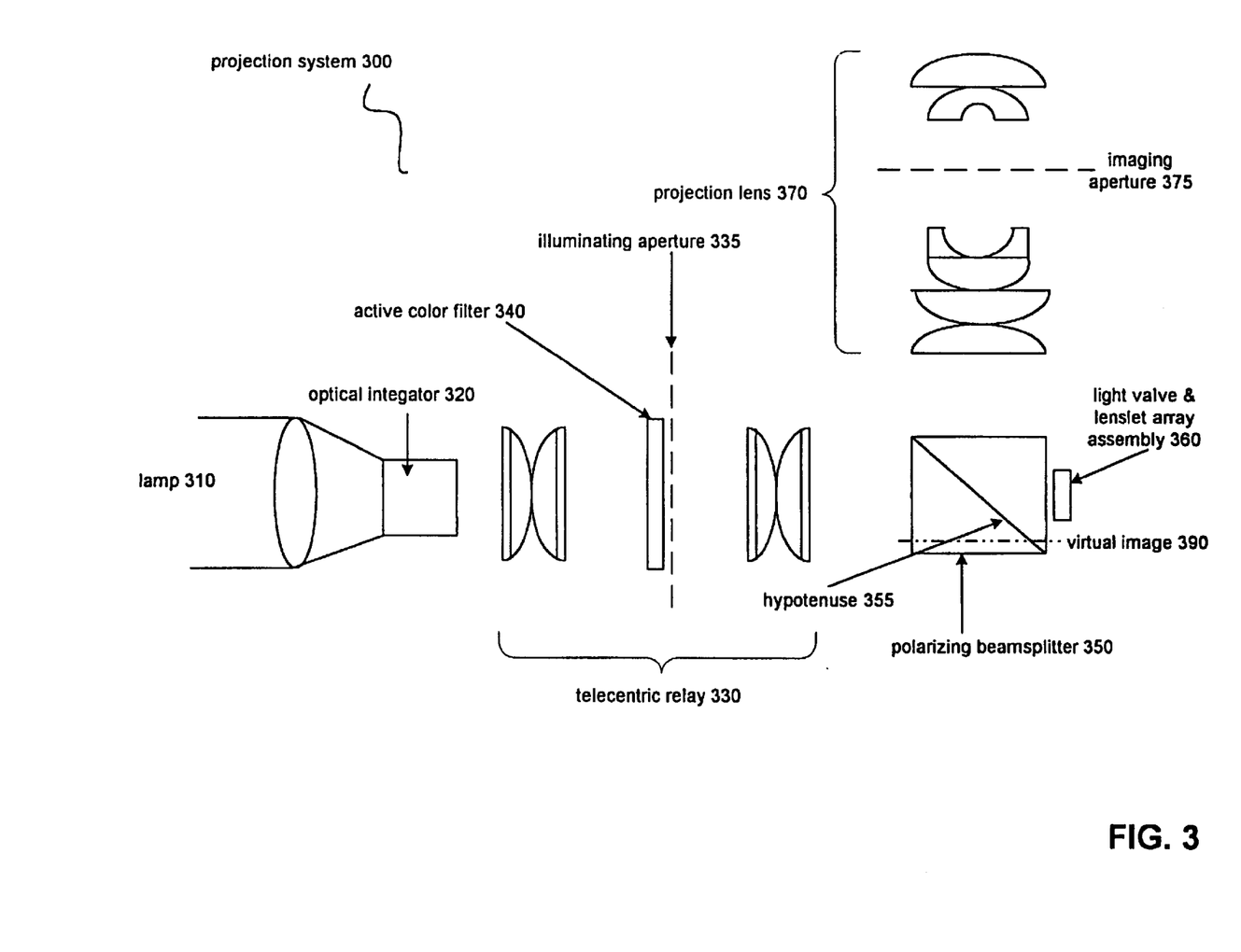
FIG. 3 illustrates an projection system utilizing an active color filter and lenticular array according to one or more embodiments of the invention.

FIG. 3 illustrates a projection system 300 utilizing an active color filter and lenticular array according to one or more embodiments of the invention. The projection system 300 is initiated by a lamp 310 which is typically a spatially confined light source with a reflector. The light supplied by lamp 310 is shone into an optical integrator 320. Optical integrator 320 is a slab of glass, typically rectangular in configuration, which by internally reflecting causes the light from lamp 310 to become spatially uniform. The output of the optical integrator 320 is a set of light rays that will eventually be imaged onto a lightvalve & lenslet array assembly 360. For this purpose, the projection system 300 uses telecentric relay 330 composed of a series of concentrating lenses which focus the light from optical integrator 320 onto the appropriate portions of the lightvalve & lenslet array assembly 360. The lenslet array portion of lightvalve & lenslet array assembly 360 is lenticular in configuration (as shown in FIG. 1) for a one-dimensional dithering, and rectangular for a two-dimensional dithering.

In an embodiment of the invention, an active color filter 340 is placed at an illuminating aperture plane 335 (between the lens structure halves) of the telecentric relay 330. Active color filter 340 is an active color filter with Red, Green and Blue sections, for example, and preferably, is switchable electronically. Using an electronically switchable filter for the active color filter 340 enables it to provide time sequential or phased output. As discussed above with regard to FIG. 2, the active color filter can be programmed to cycle fully through three phases with each phase duration being $\frac{1}{180}$th of a second (thus, achieving a 60 Hertz overall frame rate).

The active color filter 340 is placed such that the illuminating aperture plane 335 coincides with the output plane of the active color filter 340. The optical projection system is configured such that the illuminating aperture plane 335 and the imaging aperture plane 375 are optically 'conjugate' to one another. As a result of being optically conjugate, any point in the illuminating aperture plane 335 is imaged onto a corresponding point in the imaging aperture plane 375. Advantageously, and unlike other systems, since the planes 335 and 375 are optically conjugate, the active color filter 340 may be placed at the illuminating aperture plane 335 instead of the imaging aperture plane 375 (as shown in the FIG. 1 system). This may be of considerable practical advantage since the illuminating aperture plane 335 is usually more accessible than the imaging aperture plane 375.

The lightvalve & lenslet array assembly 360 is placed behind a polarizing beamsplitter 350. The polarizing beamsplitter 350 performs the function of separating the illuminating light coming from the telecentric relay 330 from the light reflected by the lightvalve assembly 360. The lightvalve changes the polarization of light which is to form the image. Hence, due reflection from the hypotenuse 355 of the polarizing beamsplitter 350, the light which is to form the image is directed through a projection lens 370. The polarizing beamsplitter 350 thus diverts the image through the projection lens 370.

Projection lens 370 is a sequence of lensing elements projecting the output of the lightvalve & lenslet array assembly 360 onto the viewing screen (not shown). Due to the arrangement of the elements of the projection system 300, the illuminating aperture plane 335 and imaging aperture plane 375 are conjugate to one another in the optical sense, this allows the active color filter 340 to be placed at the illuminating aperture plane 335 which may have commercial/practical implementation advantage. In other embodiments, for example, the lenslet array and lightvalve can be built and placed separate from one another. Where the lenslet array and lightvalve are separated from one another, the relay optics may have a different role. For instance, if the lenslet array were placed between the filter and the relaying optics, the relaying optics would have to resolve single pixels. A variety of arrangements of the integrator, lenslet arrays and filters may be possible depending upon preference or design.

Figure 4:
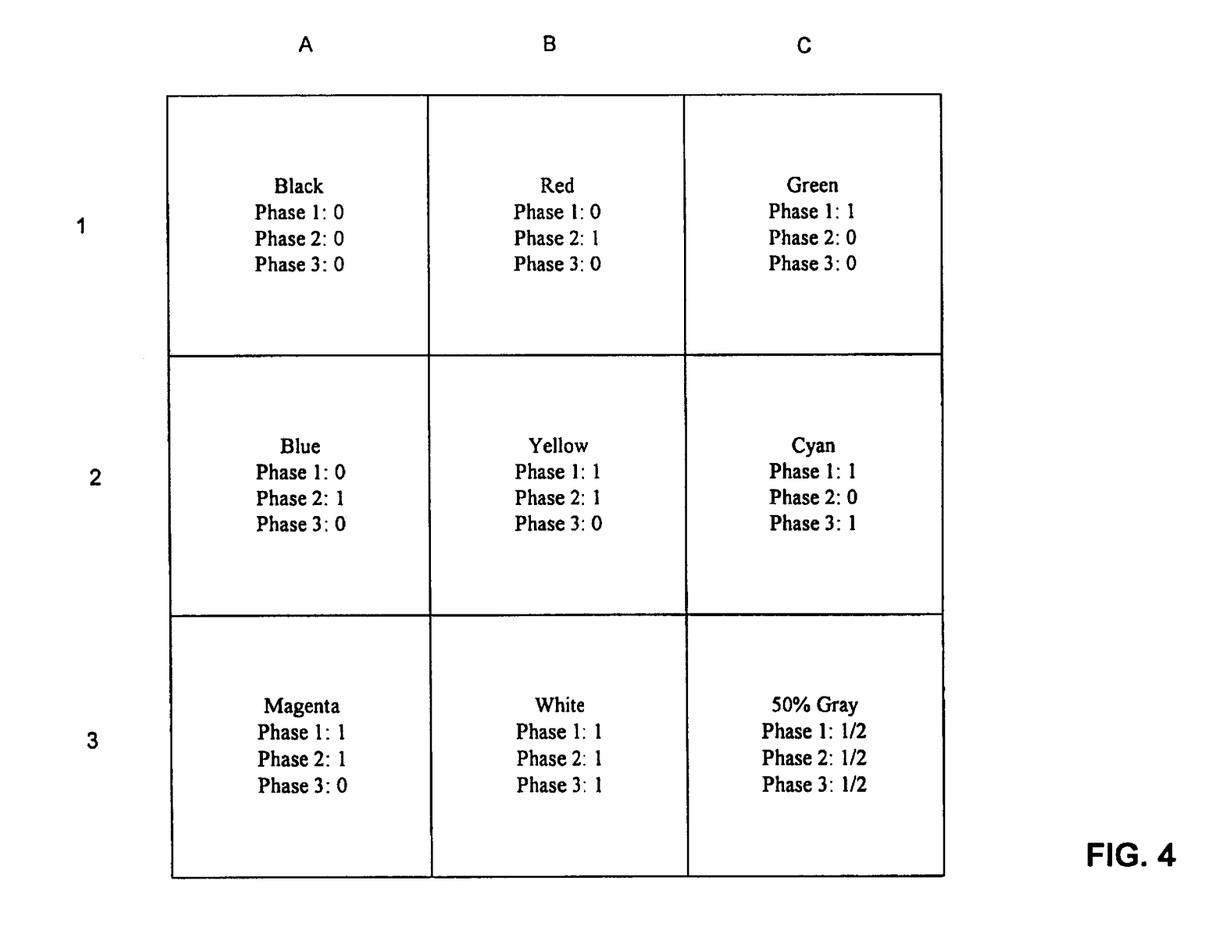
FIG. 4 illustrates nine different color pixels as they would appear on an imaging screen.

FIG. 4 illustrates nine image pixels, each of a different color, as they would be viewed on a screen placed at the plane IP2. This particular group of pixels extends from A1 to C3. These different image colors can be achieved by driving each of the corresponding lightvalve pixels appropriately during its three phases. The combined effect of these drives, listed in FIG. 4 and in the table below, is a full frame pixel of the appropriate color. The nine pixel section lightvalve shown in FIG. 2, in phases 1, 2 and 3, is used to arrive at the following drives, shown on a relative basis, from a minimum of zero to a maximum of one:

| Pixel | Color | Phase 1 | Phase 2 | Phase 3 |
|---|---|---|---|---|
| A1 | Black | 0 | 0 | 0 |
| B1 | Red | 0 | 1 | 0 |
| C1 | Green | 1 | 0 | 0 |
| A2 | Blue | 0 | 1 | 0 |
| B2 | Yellow | 1 | 1 | 0 |
| C2 | Cyan | 1 | 0 | 1 |
| A3 | Magenta | 1 | 1 | 0 |
| B3 | White | 1 | 1 | 1 |
| C3 | 50% Gray | 1/2 | 1/2 | 1/2 |

By way of illustration, consider pixel A3 on the screen which is to be imaged as a Magenta colored full frame pixel. From FIG. 2, the pixel a3 on the lightvalve corresponds to Section 7 of the active color filter. For this section, Blue (B) is transmitted during phase 1, Red (R) is transmitted during phase 2 and Green (G) during phase 3. From the table above, the drive voltages for the pixel A3 are 1 during phases 1 and 2, and 0 during phase 3. Therefore, the screen will, over the course of a complete frame, be illuminated with relative intensities of 1 of Blue (corresponding to phase 1), 1 of Red (corresponding to phase 2) and 0 or none of Green (corresponding to the drive on phase 3). When viewed together this combination of drive voltages when applied will project a magenta color for pixel position A3. Black pixels are absent of Red, Green and Blue and thus, are not driven (have zero drive voltages applied to them) during the three phases.

Though only nine different color pixels are shown, a total of 27 colors may be represented given possible drive voltages of only 0, ½, and 1. By further discriminating the available level of drive voltages that may be applied to the three phases, the richness of color variation can be increased. For instance, the drive voltages may be differentiated in increments of ¼ rather than ½. This would yield five (5) levels of drive voltages, 0, ¼, ½, ¾ and 1 and yields 125 different colors. In general, given that there are k drive levels for a three phase active color filter (or switchable filter), then the total available colors are k^3.

Figure 5:
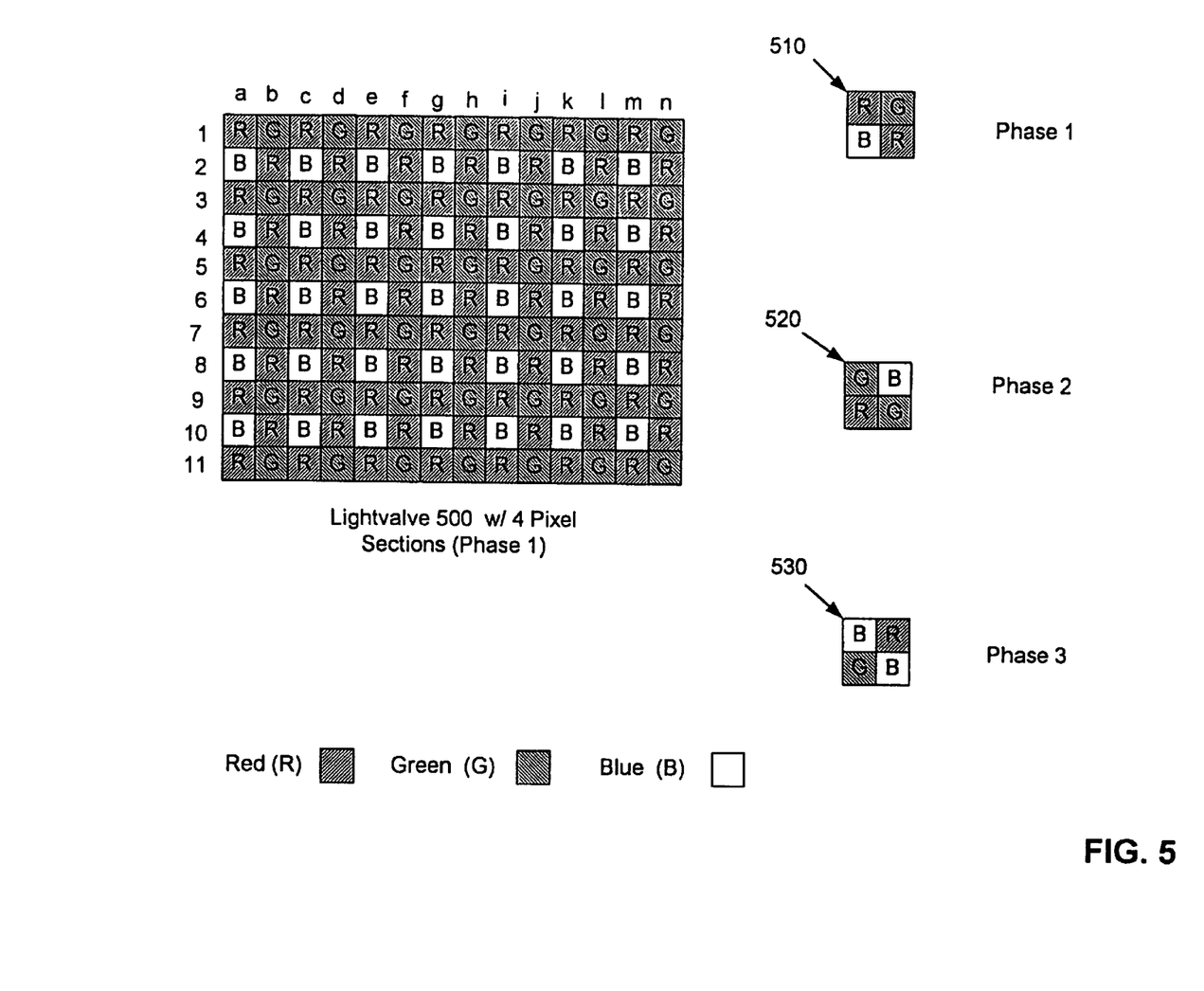
FIG. 5 illustrates a portion of a lightvalve generated by a four pixel block active color filter using Red, Green and Blue.

FIG. 5 illustrates a section of a lightvalve generated by a four pixel block active color filter using Red, Green and Blue. In FIG. 2, a nine pixel block sequencer produces the pattern through the lightvalve. The number and arrangement of the pixels in the active color filter is largely a matter of preference and will appear in the same pattern over the pixel locations of the lightvalve. A four-pixel block 510 is shown as a result of an active color filter operating in Phase 1. The active color filter in Phase 1 of its operation produces a pattern of a Red pixel in the upper left and lower right, a Green pixel in the upper right and a Blue pixel in the lower left of the block 510. The lightvalve 500 is shown to mirror this pattern. On the lightvalve 500, pixel a1 and b2 show Red while pixel a2 shows Blue and pixel b1 shows Green. This arrangement is repeated with pixels c1, d1, c2 and d2, which forms a block to the right of the block formed by pixels a1, a2, b1 and b2. Likewise, an identical four-pixel block starts below pixel a2 at pixel a3, and covers pixels a3, a4, b3 and b4. The pattern of two Red colored pixel locations and one Green and one Blue appears as a result of the active color filter being in Phase 1 of its operation which lasts for ¹⁄₁₈₀th of a second (in the case of a desired overall frame rate of 60 Hertz).

In Phase 2 of its operation, a four-pixel block 520 with two Green pixels, one Blue pixel, and one Red pixel are generated by the active color filter. The Green pixels are located in the upper left and lower right of block 520 while the Red pixel is located lower left of block 520 and the Blue pixel in the upper right of block 520. While not shown, lightvalve 500 will repeatedly display the pattern of block 520 starting from pixel location a1 when the active color filter operates in Phase 2.

In Phase 3 of its operation, a four-pixel block 530 with two Blue pixels, one Green pixel, and one Red pixel are generated by the active color filter. The Blue pixels are located in the upper left and lower right of block 520 while the Red pixel is located lower left of block 520 and the Green pixel in the upper right of block 520. While not shown, lightvalve 500 will repeatedly display the pattern of block 530 starting from pixel location a1 when the active color filter operates in Phase 3

The combined effect of applying Phase 1, 2 and 3 filtering of the active color filter through lightvalve 500 is a combination of Red, Green and Blue intensities for each pixel location. Thus, all the pixel locations a1, a2, a3, . . . , a11, b1, b2, b3, . . . , b11 . . . n1, n2, n3, . . . n11 will show a combination of Red, Green and Blue within ¹⁄₆₀th of a second, giving a frame rate of 60 Hertz. In Phase 1, there is a predominance of Red pixels, in Phase 2, a predominance of Green pixels and in Phase 3, a predominance of Blue pixels.

Figure 6:
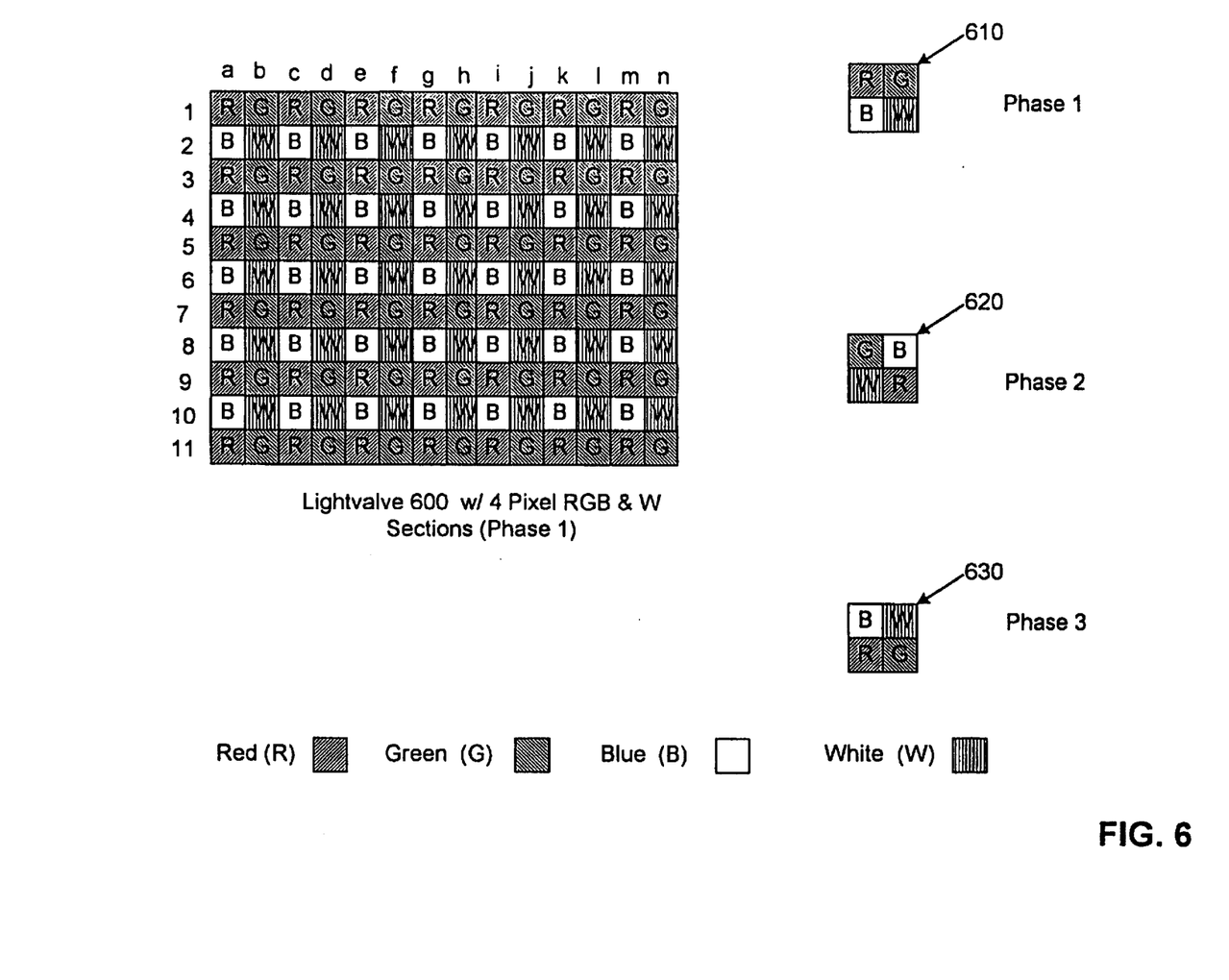
FIG. 6 illustrates a portion of a lightvalve generated by a four pixel block active color filter using Red, Green, Blue and White.

FIG. 6 illustrates a lightvalve generated by a four pixel block active color filter using Red, Green, Blue and White. A four-pixel block 610 is shown as a result of an active color filter operating in Phase 1. The active color filter in Phase 1 of its operation produces a pattern of a Red pixel in the upper left, a Green pixel in the upper right, a Blue pixel in the lower left and a White pixel in the lower right of the block 610. The lightvalve 600 is shown as mirroring this pattern. On the lightvalve 600, pixel a1 shows Red while pixel a2 shows Blue, pixel b1 shows Green and pixel b2 shows White. This arrangement is repeated with pixels c1, d1, c2 and d2, which forms a block to the right of the block formed by pixels a1, a2, b1 and b2. Likewise, an identical four-pixel block starts below pixel a2 at pixel a3, and covers pixels a3, a4, b3 and b4. The pattern of one Red colored pixel location, one Green, one Blue and White appears as a result of the color sequencer being in any one phase of its operation which lasts for 1/180th of a second (in the case of a desired overall frame rate of 60 Hertz).

In Phase 2 of its operation, a four-pixel block 620 with the same one Green pixel, one Blue pixel, one Red pixels and one White pixel are generated by the color sequencer, but in a different orientation from block 610. The Green pixel is located in the upper left of block 620 while the Red pixel is located lower right of block 620 the Blue pixel in the upper right of block 620 and the White pixel in the lower left of block 620. While not shown, lightvalve 600 will repeatedly display the pattern of block 620 starting from pixel location a1 when the color sequencer operates in Phase 2.

In Phase 3 of its operation, a four-pixel block 620 with the same one Green pixel, one Blue pixel, one Red pixels and one White pixel are generated by the active color filter, but in a different orientation from block 610 or 620. The Blue pixel is located in the upper left of block 630 while the Green pixel is located lower right of block 630 the White pixel in the upper right of block 630 and the Red pixel in the lower left of block 630. While not shown, lightvalve 600 will repeatedly display the pattern of block 630 starting from pixel location a1 when the active color filter operates in Phase 3.

The combined effect of applying Phase 1, 2 and 3 filtering of the active color filter through lightvalve 600 is a combination of Red, Green, Blue and White intensities for each pixel location. Thus, all the pixel locations a1, a2, a3, ..., a11, b1, b2, b3, ..., b11 ... n1, n2, n3, ... n11 will show a combination of Red, Green, Blue and White within 1/60th of a second, giving a frame rate of 60 Hertz. Unlike the lightvalve pattern produced at each in the FIG. 5 example, no single color, Red, Green, Blue nor White predominates at a given phase. Further, with the addition of a White filtered pixel, the total image produced can exhibit a 50% greater luminance over the lightvalves shown in FIGS. 2 and 5 when displaying pixels whose composite color over the three phases is to be White. However, this also implies that the luminances when displaying the colors Red, Green and Blue, in composite, would be 25% less (due to the ¼ fewer pixels transmitted in each primary color).

Figure 7:
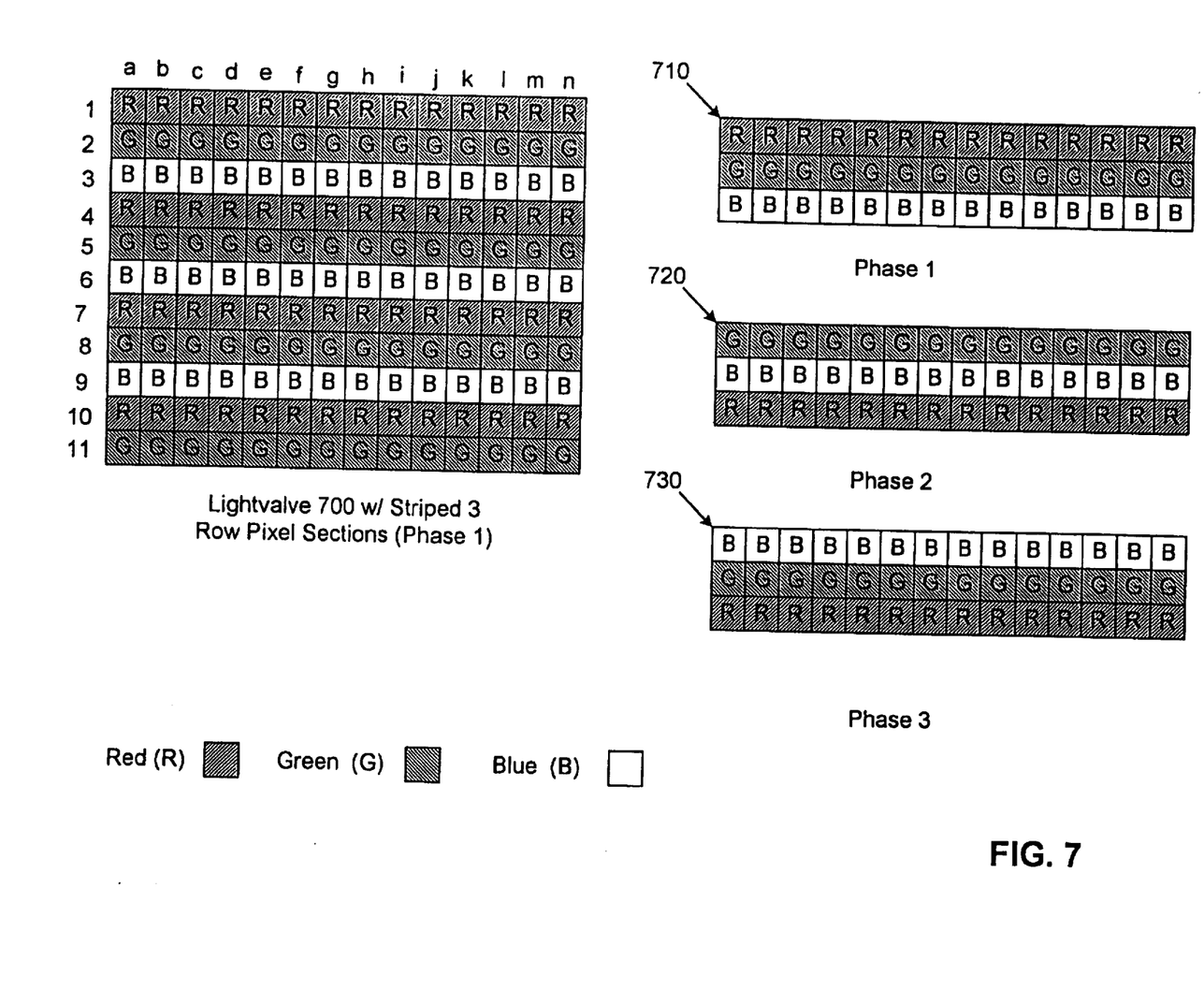
FIG. 7 illustrates a portion of a lightvalve generated by a striped pattern active color filter.

FIG. 7 illustrates a lightvalve generated by a striped pattern active color filter. Striped pixel block 710 results from the active color filter operating in Phase 1. Block 710 exhibits a first row of Red pixels followed by a row of Green pixels and then a row of Blue pixels. This striped pattern is repeated every three rows of lightvalve 700 when the active color filter supplies Phase 1 filtered light rays.

Striped pixel block 720 results from the active color filter operating in Phase 2. Block 720 exhibits a first row of Green pixels followed by a row of Blue pixels and then a row of Red pixels. While not shown, lightvalve 700 will repeatedly display the striped pattern of block 720 starting from pixel row "a" when the active color filter operates in Phase 2. Striped pixel block 730 results from the active color filter in Phase 1. Block 730 exhibits a first row of Blue pixels followed by a row of Red pixels and then a row of Green pixels. While not shown, lightvalve 700 will repeatedly display the striped pattern of block 730 starting from pixel row "a" when the active color filter operates in Phase 3. The lenticular array for such a striped pattern would be made cylindrical with a width equivalent to 3 lightvalve pixels.

The combined effect of applying Phase 1, 2 and 3 filtering of the active color filter through lightvalve 700 is a combination of Red, Green, and Blue intensities for each pixel location of lightvalve 700. Thus, all the nixel locations a1, a2, a3, ..., a11, b1, b2, b3, ..., b11 ... n1, n2, n3, ... n11 will show a combination of Red, Green, Blue and White within 1/60th of a second, giving a frame rate of 60 Hertz.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. An apparatus for projecting a color image comprising:
a lenslet array for focusing light onto a projection lens; and
a lightvalve built upon said lenslet array, said lightvalve sectioned in accordance with the filtering scheme utilized in projecting said color image, wherein each section of said lightvalve is mapped to each section of an active color filter.

2. An apparatus according to claim 1 wherein said lenslet array is lenticular in configuration.

3. An apparatus for projecting a color image comprising:
a lenslet array for focusing light onto a projection lens;
a lightvalve built upon said lenslet array, said lightvalve sectioned in accordance with the filtering scheme utilized in projecting said color image; and
an active color filter, wherein said filtering scheme is actively controlled via said active color filter such that colors are sequenced in the time domain.

4. An apparatus according to claim 3 wherein said lightvalve is sectioned into a block of four pixels.

5. An apparatus according to claim 3 wherein said lightvalve is sectioned into three stripes of pixels.

6. An apparatus for projecting a color image comprising:
a lenslet array for focusing light onto a projection lens; and
a lightvalve built upon said lenslet array, said lightvalve sectioned in accordance with the filtering scheme utilized in projecting said color image,
wherein said lightvalve is sectioned into a block of nine pixels, and wherein said filtering scheme is actively controlled such that colors are sequenced in the time domain.

7. An apparatus for projecting a color image comprising:
a lenslet array for focusing light onto a projection lens; and
a lightvalve built upon said lenslet array, said lightvalve sectioned in accordance with the filtering scheme utilized in projecting said color image, wherein each lenslet of said lenslet array transmits light from an active color filter to a different one of said lightvalve sections.

8. An apparatus for projecting a color image comprising:
a lenslet array for focusing light onto a projection lens; and
a lightvalve built upon said lenslet array, said lightvalve sectioned in accordance with the filtering scheme utilized in projecting said color image, wherein each lenslet of said lenslet array transits light from k sections of an active color filter to a group of k pixels within a different section of said lightvalve.

9. An apparatus according to claim 8 wherein at least two of said sections of said active color filter simultaneously emit the same color of light.

10. A method for use within an optical projection system, comprising:

using a filtering scheme to filter light;

transmitting said filtered light through a lightvalve;

transmitting said filtered light from said lightvalve through a lenslet array;

focusing, via said lenslet array, said filtered light onto a projection lens;

sectioning said lightvalve in accordance with said filtering scheme; and mapping each section of said lightvalve to each section of an active color filter.

11. A method according to claim 10 wherein said lenslet array is lenticular in configuration.

12. A method according to claim 10 wherein said sectioning comprises sectioning said lightvalve into a block of four pixels.

13. A method according to claim 10 wherein said sectioning comprises sectioning said lightvalve into three stripes of pixels.

14. A method for use within an optical projection system, comprising:

using a filtering scheme to filter light;

transmitting said filtered light through a lightvalve;

transmitting said filtered light from said lightvalve through a lenslet array;

focusing, via said lenslet array, said filtered light onto a projection lens;

sectioning said lightvalve in accordance with said filtering scheme; and actively controlling said filtering via an active color filter such that colors are sequenced in the time domain.

15. A method for use within an optical projection system, comprising:

using a filtering scheme to filter light;

transmitting said filtered light through a lightvalve;

transmitting said filtered light from said lightvalve through a lenslet array;

focusing, via said lenslet array, said filtered light onto a projection lens; and sectioning said lightvalve in accordance with said filtering scheme, wherein said sectioning comprises sectioning said lightvalve into a block of nine pixels.

16. A method for use within an optical projection system, comprising:

using a filtering scheme to filter light;

transmitting said filtered light through a lightvalve;

transmitting said filtered light from said lightvalve through a lenslet array;

focusing, via said lenslet array, said filtered light onto a projection lens;

sectioning said lightvalve in accordance with said filtering scheme; and transmitting, for each lenslet of said lenslet array, light from k sections of an active color filter to a group of k pixels within a different section of said lightvalve.

17. A method according to claim 16 further comprising simultaneously emitting the same color of light from at least two of said sections of said active color filter.

* * * * *